United States Patent [19]

Fan et al.

[11] Patent Number: 4,701,928
[45] Date of Patent: Oct. 20, 1987

[54] DIODE LASER PUMPED CO-DOPED LASER

[75] Inventors: Tso Y. Fan; Robert L. Byer, both of Stanford, Calif.

[73] Assignee: Board of Trustees, Leland J. Stanford University, Stanford, Calif.

[21] Appl. No.: 782,880

[22] Filed: Oct. 2, 1985

[51] Int. Cl.⁴ .......................... H01S 3/14; H01S 3/091
[52] U.S. Cl. .......................................... 372/68; 372/70
[58] Field of Search ...................... 372/39, 41, 68, 69, 372/70

[56] References Cited

U.S. PATENT DOCUMENTS 4,081,761  3/1978  Melamed .............................. 372/68

Primary Examiner—Gene Wan
Attorney, Agent, or Firm—Harry E. Aine

[57] ABSTRACT

A miniature solid state near room temperature laser includes a laser crystal doped with a laser ion and an absorber ion. The absorber ion absorbs pumping radiation derived from the output of a laser diode and transfers the absorbed energy to the laser ion for inverting the population of the desired energy transition levels to produce an eyesafe output beam with wavelengths greater than 1.4 microns. In a preferred embodiment, the host crystal is YAG and it is co-doped with Ho as the laser ion and Er as the absorber ion. A small concentration of Tm ion may be doped into the crystal to enhance pumping efficiency. Improved efficiency can be obtained by cooling the laser crystal with a thermoelectric cooler and by tuning the output of the diode laser pump to an absorption peak of the absorbing ion.

20 Claims, 6 Drawing Figures

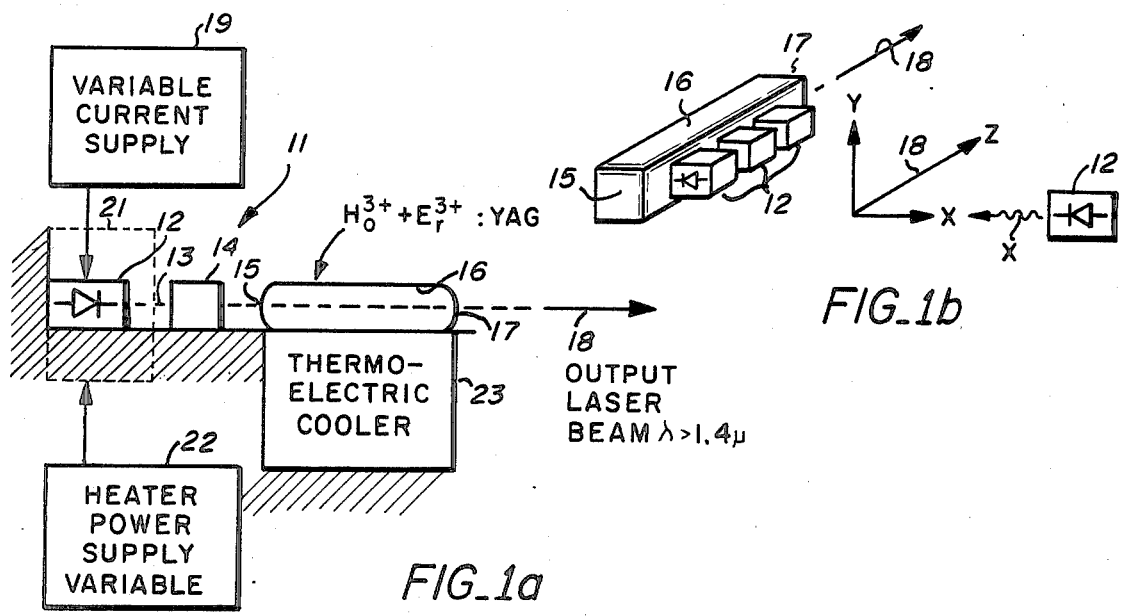
FIG_1a
FIG_1b
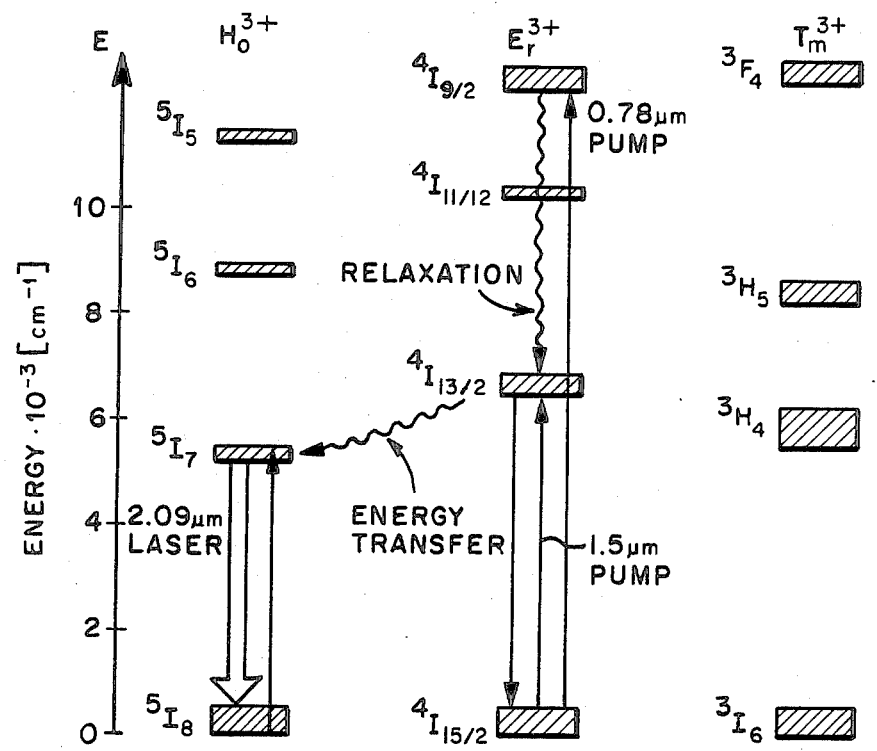
FIG_2

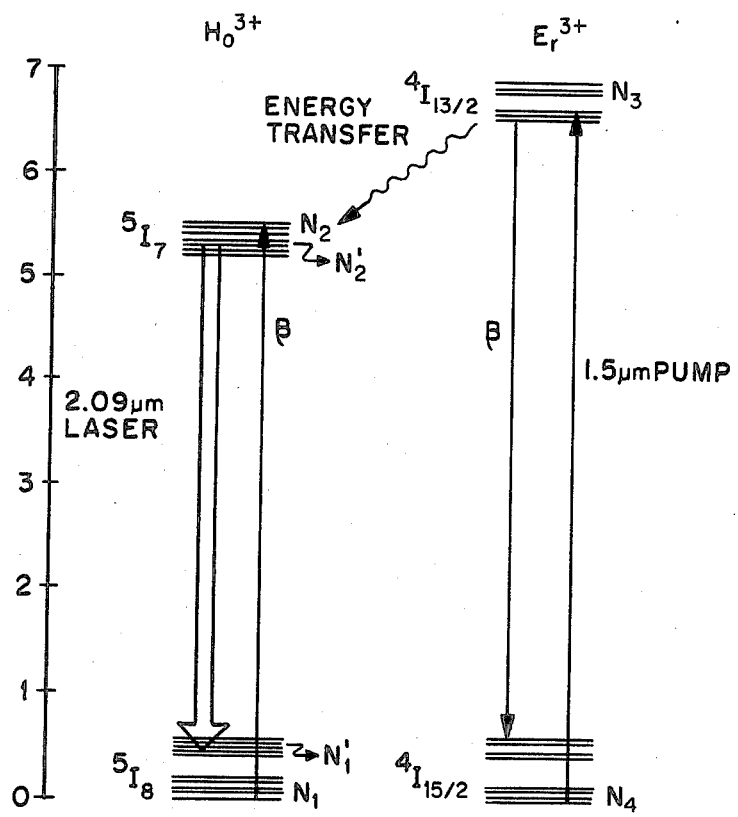
FIG_3
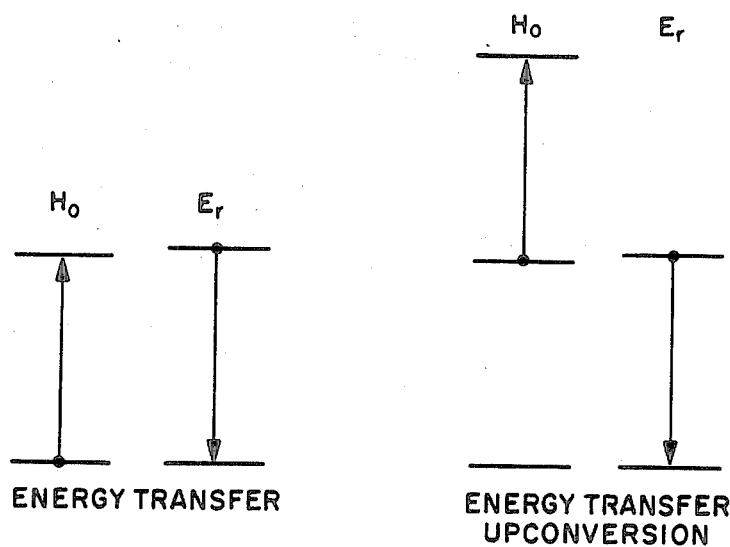
FIG_4a  FIG_4b

DIODE LASER PUMPED CO-DOPED LASER

The invention herein described was made in the course of or under a contract or subcontract with the Department of Defense, Navy Branch, Contract No. N00014-83-K-0449.

RELATED CASES

The present invention is a continuation-in-part of U.S. application Ser. No. 674,948 filed Nov. 26, 1984, now abandoned in favor of continuation-in-part application Ser. No. 896,865 filed Aug. 15, 1986.

BACKGROUND OF THE INVENTION

The present invention relates in general to miniature solid state lasers and, more particularly, to an improved diode laser pumped co-doped solid state laser for producing eyesafe radiation at or near room temperature.

DESCRIPTION OF THE PRIOR ART

Heretofore it has been proposed to produce an eyesafe solid state laser in which a co-doped YAG laser crystal was pumped by a solid state neodymium laser to produce output radiation in the eyesafe two micron wavelength range at room temperature with pulsed operation. Such YAG crystals were co-doped with ytterbium ions for absorbing the pumping radiation at 1.06 microns, such absorber ions transferring the absorbed pumping energy to the lightly doped lasant ions of thulium (Tm) or holmium (Ho).

Such a prior art laser is disclosed in an article appearing in the Soviet Journal of Quantum Electronics, Vol. 7, No. 5 of May 1977 at pgs. 633 and 634. The problem with the prior art neodymium YAG pumped solid state laser is that the pumping radiation at 1.06 microns is in the tail of the absorption spectrum of the Yb ion, consequently, a relatively long laser rod must be used to absorb the pumping radiation. Moreover, the efficiency of the neodymium YAG pump is relatively low, essentially ruling out a miniature solid state laser operating in the eyesafe band of wavelengths longer than 1.4 microns.

Others have proposed a room temperature light emitting diode pumped LiYbF$_4$ crystal wherein the ytterbium (Yb) serves as the absorber ion, such crystal being further co-doped with five atomic percent thulium (Tm) and 0.25% holmium (Ho). Although this laser was proposed theoretically, it was not demonstrated practically. The problem with using a light-emitting diode pumping source is that the output pumping radiation is not coherent and accordingly cannot be focused into a small volume which means that the lasing thresholds will be relatively high when using a light-emitting diode pump. The light-emitting diode pumped LiYbF$_4$ laser is disclosed at pg. 72 of Technical Report No. 19 titled: "Energy Transfer in Sensitized Rare Earth Lasers", by Donald E. Castleberry, dated September 1975 and published by the Massachusetts Institute of Technology, Cambridge, Mass., Department of Electrical Engineering and Computer Science and Center for Material Science and Engineering Crystal Physics Laboratory.

It would be desirable to provide a miniature laser with output in the eyesafe wavelength region above 1.4 microns, preferably at or near room temperature.

SUMMARY OF THE PRESENT INVENTION

The principal object of the present invention is the provision of an improved miniature solid state laser producing an output beam with wavelengths longer than 1.4 microns.

In one feature of the present invention, the coherent output beam of a diode laser is utilized to pump a solid state laser medium doped with a laser ion and an absorber ion such absorber ion absorbing the pumping radiation and transferring the pumping energy to the laser ion for more efficient pumping thereof.

In another feature of the present invention, the laser ion is selected from a group consisting of thulium (Tm), holmium (Ho), dysprosium (Dy), ytterbium (Yb), and uranium (U).

In another feature of the present invention, the absorber ion is selected from the group consisting of thuluim (Tm), erbium (Er), neodymium (Nd) and uranium (U) with the absorbers being paired with an appropriate laser ion.

In another feature of the present invention, the host laser material which is doped with the absorber and laser ions is yttrium aluminum garnet (YAG), whereby the crystal field of the host produces relatively large ground state splitting which means that less population needs to be inverted to reach laser threshold operation.

In another feature of the present invention, a co-doped laser crystal material is doped with a further concentration of another ion such as thulium in the case of erbium (Er) and holmium (Ho) co-doping to moderate energy transfer up-conversion and increase transfer efficiency which would otherwise limit the desired population inversion of the lasant ion.

In another feature of the present invention, tuning means are provided for tuning the wavelength of the diode laser pumping radiation to an absorption peak of the absorber ion.

In another feature of the present invention, the pumping radiation from the laser diode is co-axial with the resonator or directed through the side of a slab and absorbed in a small volume whereby efficient operation is obtained.

Other features and advantages of the present invention will become apparent upon a perusal of the following specification taken in connection with the accompanying drawings wherein:

BRIEF DESCRIPTION OF THE DRAWINGS

FIG. 1(a) is a schematic diagram, partly in block diagram form, of a laser system incorporating features of the present invention, FIG. 1(b) is a perspective view of an alternative embodiment of the system of FIG. 1(a), FIG. 2 is an energy level diagram for the absorber and lasing ions depicting the energy transfer between the absorber ion and the laser ion, FIG. 3 is an enlarged detail view of a portion of the diagram of FIG. 2 depicting the field splitting of the ground state energy levels of the absorber and laser ions, and FIGS. 4(a) and 4(b) are energy level diagrams for absorber and laser ions depicting pumping energy transfer and pumping energy transfer up-conversion.

DESCRIPTION OF THE PREFERRED EMBODIMENTS

Referring now to FIGS. 1(a) and 1(b) there is shown a diode laser pumped solid state laser incorporating features of the present invention. The laser 11 includes a diode laser 12 as a source of pumping radiation. The coherent output beam 13 of the pumping laser diode 12 is passed through a lens, such as a gradient refractive index lens 14 which focuses the pumping beam 13 into a small spot, less than 100 microns square on the transmissive input face of a mirror 15 formed on the curved input face of a laser crystal 16. The pumping radiation serves to pump the laser crystal 16 to invert the population densities of a certain laser transition to provide for stimulated coherent emission of radiation at a resonant wavelength of the optical resonator formed by input mirror 15 and an output mirror 17 formed on the output curved face of the laser crystal 16. The output mirror 17 is partially transmissive at the output wavelength of the laser for extracting a portion of the stimulated radiation within the laser crystal 16 as an output beam 18.

The input mirror 15 is transmissive to radiation at the pumping wavelength and is essentially totally 100% reflective of the stimulated emission of radiation within the laser crystal 16 at the output wavelength. The output mirror 17 is partially transmissive at the wavelength of the stimulated emission of radiation such as 3% transmissive for producing the output beam 18. In this example, the laser crystal 16 is preferably formed as an elongated rod with the length of the rod being dimensioned to provide a resonant mode of the optical resonator, defined by the input and output mirrors 15 and 17, at the wavelength of the lasant energy transitions of the laser ion contained within the laser crystal 16. In other examples, the laser crystal may be in the shape of a totally internally reflecting slab and the diode laser pumping may be from the side of the slab laser crystal. (See FIG. 1b.)

In a preferred embodiment, the laser crystal 16 comprises a yttrium aluminum garnet ($Y_3Al_5O_{12}$) (YAG) doped with a suitable absorber ion such as erbium (Er) to a relatively high concentration, as of 20 atomic percent, and co-doped with a laser ion, such as holmium (Ho), at a relatively low atomic percent such as 0.7 atomic percent. Either 1.5 micron or 0.78 micron wavelength pumping radiation from a diode laser is used as the source of pumping radiation 12 for populating the erbium (Er) absorption transitions which are between the $^4I_{15/2}$-$^4I_{13/2}$ or $^4I_{15/2}$-$^4I_{9/2}$ energy levels respectively. If the 0.78 micron wavelength is used, the excited Er absorber ion then relaxes to the $^4I_{13/2}$ level from the $^4I_{9/2}$ level. From the Er $^4I_{13/2}$ level, the pump induced energy is then transferred to the Ho $^5I_7$ level of the laser ion. The laser then oscillates on the $^5I_7$—$^5I_8$ transition with an output wavelength of 2.09 microns. This is shown in the energy level diagram of FIG. 2. If the 1.5 micron wavelength is used to excite the $^4I_{13/2}$ level of the Er ion, the energy transfer is from this level to the $^5I_7$ level of the laser ion, Ho.

The pumping wavelength of the laser diode 12 can be tuned to the absorption peak of the absorber ion by varying the composition of the diode laser material. More precise wavelength tuning can be accomplished by varying the current supplied to the laser diode 12 from a variable current supply 19. As an alternative, the pumping wavelength of the laser diode 12 can be tuned to the absorption peak of the absorber ion by changing the temperature of the laser diode as incorporated within an oven 21 excited with a variable heater current from a heater power supply 22.

The threshold power level of the pumping radiation, for obtaining laser operation, can be decreased by cooling the laser crystal 16 by means of a thermoelectric cooler 23 coupled in heat-exchanging relation with the laser crystal 16. Such thermoelectric coolers are capable of reducing the temperature of the crystal 16 to on the order of 200° Kelvin. Suitable laser diodes such as InGaAsP material producing output pumping radiation in the 1.50 to 1.56 micron range are commercially available from Lytel Inc. of Sommerville, N.J. Also, suitable diode lasers of GaAlAs producing output pumping radiation at 0.78 microns are available from Sharp of Paramus, N.J. as model LT 024MD. Suitable YAG crystals 16 are commercially available from Airtron of Morris Plains, N.J.

In a typical example for the laser 11 of FIG. 1, a threshold pumping power level can be calculated from a rate equation model. The energy states are labeled as shown in FIG. 3, and the population of each manifold is given by $N_I$ for the Ith manifold. Each manifold consists of a number of energy levels which are split in energy by the crystal field of the host. The populations of these splittings are related to that of the entire manifold by a Boltzmann distribution. YAG crystal material is chosen as the host because the Ho laser ions have relatively large ground state crystal field splitting in this material compared to other host materials such as $LiYF_4$, (YLF), which means that less population needs to be inverted to reach lasing threshold. The pumping wavelength will be taken to be 1.53 microns which is the $Er^4I_{15/2}$-$^4I_{13/2}$ transition.

The laser transition occurs between specific field splittings of the two Ho manifolds which have populations $N_2'$ and $N_1'$ for the upper and lower splittings, respectively. It is not known exactly but it is believed that the laser transition occurs between the upper laser level crystal field splitting near the bottom of the $^5I_7$ manifold and that the lower laser level crystal field splitting is near the top of the $^5I_8$ manifold. It is believed that the crystal field levels are $\approx 40$ cm$^{-1}$ above and below the bottom and the top of the $^5I_7$ and $^5I_8$ manifolds as shown in FIG. 3. This yields the output wavelength of 2.09 microns.

The condition for threshold is that the population of the crystal field splitting in the upper manifold exceed that in the splitting in the lower manifold.

The rate equations for the manifold populations in steady state are as follows:

$$\dot{N}_1 = N_2/\tau_1 - \beta = O \qquad \text{Eq. (1a)}$$

$$\dot{N}_2 = -N_2/\tau_1 + \beta = O \qquad \text{Eq. (1b)}$$

$$\dot{N}_3 = -N_3/\tau_2 - \beta + R = O \qquad \text{Eq. (1c)}$$

$$\dot{N}_4 = N_3/\tau_2 + \beta - R = O \qquad \text{Eq. (1d)}$$

and $$N_1 + N_2 = N_H \qquad \text{Eq. (1e)}$$

$$N_3 + N_4 = N_E \qquad \text{Eq. (1f)}$$

where $\tau_1$ and $\tau_2$ are the fluorescent lifetimes of the Ho $^5I_7$ and Er $^4I_{13/2}$ manifolds, respectively, $\beta$ is the energy transfer rate, R is the pump rate, and $N_H$ and $N_E$ are the concentrations of the Ho and Er respectively. The terms involving $\tau$ are terms due to radiative and non-radiative relaxation, and the energy transfer rate $\beta$ is a function of the mechanism for transfer and the populations $N_H$ and $N_E$ with $\beta$ increasing with these concentrations.

It should be noted that only two of the first four equations are independent. In the calculations, it is given that the laser crystal is YAG:20 at. % Er, 0.7 at. % Ho. This allows simplification of the rate equations. First of all, at this level of doping $N_4 >> N_3$, so set $N_4 = N_E$. *Energy transfer processes are efficient so* $\beta >> N_3/\tau_2$ or $\beta \approx R$. This implies that every Er excitation gets transferred the Ho Laser ion. This allows the equations above, in Eq. 1 to be rewritten as:

$$N_2/\tau_1 - R = 0 \qquad \text{Eq. (2a)}$$

$$N_1 + N_2 = N_H \qquad \text{Eq. (2b)}$$

where the substitution $\beta = R$ has been made. Only the population of the Ho laser ion is considered since this is the one which matters in determining threshold.

In an end pumped laser geometry, as shown in FIG. 1, the length of the crystal 16 is taken to be 0.1 cm. For the pump beam 13, a uniform plane wave is assumed, and the intensity required to reach threshold will be calculated. The pump rate R will vary along the longitudinal axis Z of the pump beam within the crystal 16 since the beam is attenuated as it propagates along the longitudinal axis or Z direction. The pump beam intensity is given by:

$$I(Z) = I_0 \exp(-\alpha Z) \qquad \text{Eq. (3)}$$

where $I_0$ is the incident intensity, and $\alpha$ is the absorption coefficient at the pump wavelength. This yields a pump rate of:

$$R(Z) = (\alpha I_0 / h\nu_p) \exp(-\alpha Z) \qquad \text{Eq. (4)}$$

where $h\nu_p$ is the pump photon energy. Substituting this into (Eq. 2a)

$$N_2(Z) = (\alpha I_0 \tau_1 / h\nu_p) \exp(-\alpha Z) \qquad \text{Eq. (5)}$$

This gives the upper manifold population as a function of Z. This population averaged along the length of the length of the crystal is:

$$N_{2av} = \left( 1/L \int_0^L (\alpha I_0 \tau_1 / h\nu_p) \exp(-\alpha Z) dz = \right.$$

$$\left. (I_0 \tau_1 / h\nu_p L)(1 - \exp(-\alpha L)) \right) \qquad \text{Eq. (6)}$$

where L is the length of the crystal. $\tau_1$ for the Ho $^5I_7$ manifold is 12 ms, $\alpha$ at 1.53 microns for 20 atomic percent Er doping is 40 cm$^{-1}$ and $h\nu_p$ is $1.3 \times 10^{-19}$ J, and L is 0.1 cm. So:

$$N_{2av} \approx I_0 \tau_1 / h\nu_p L = 9.2 \times 10^{13} I_0 \text{ cm}^{-3} \qquad \text{Eq. (7a)}$$

$$N_{1av} \approx N_H - N_{2av} = N_H - 9.2 \times 10^{13} I_0 \text{ cm}^{-3} \qquad \text{Eq. (7b)}$$

Let $N_1'$ and $N_2'$ be the populations in the lower and upper crystal field splittings respectively. From the Boltzmann distribution, $$N_1' \approx 0.02 N_{1av} \qquad \text{Eq. (8a)}$$

$$N_2' \approx 0.08 N_{2av} \qquad \text{Eq. (8b)}$$

Substituting Eq. (7a) and Eq. (7b) into Eq. (8a) and Eq. (8b) and using the threshold condition, $N_2' > N_1'$ $$0.08(9.2 \times 10^{-} I_0) > 0.02(1.0 \times 10^{20} - 9.2 \times 10^{13} I_0)$$

or $$I_0 > \text{W/cm}^2$$

for threshold where $N_H = 1.0 \times 10^{20}$ m$^{-3}$ for 0.7% Ho doping. A diode laser can easily be focused into a spot of 100$\mu$ diameter or less. If a 100$\mu$ spot is assumed, then the threshold diode laser power is about 2 mw. The threshold diode laser power can also be reduced by lowering the temperature of the laser crystal 16 by means of the thermoelectric cooler 23 to a temperature on the order of 200° K.

A completing mechanism for the desired absorber ion energy transfer pumping is one referred to as energy transfer up-conversion (ETU). Normal absorber-lasing ion energy transfer is shown in FIG. 4a wherein the absorber ion relaxes with transfer of energy producing a population inversion of the lasing transition of the lasing ion Ho. In the case of energy transfer up-conversion, as depicted in FIG. 4b, the relaxation of the absorber ion produces population of an upper energy state of the lasing ion Ho. These two processes are in competition for Er excitation so ETU may limit the inverted population. In such a case, crystal 16 is further doped with Tm ions to limit ETU in the manner as disclosed in the aforecited technical report of Donald E. Castleberry, pg. 93.

The present invention, as thus far described, is primarily directed to a YAG crystal co-doped with Er as the absorber and Ho as the lasing ions. Other co-doped crystals may be utilized. For example, the following doping combinations are useful:

Er and Tm; Tm and Ho; Er and Dy; Tm and Dy; Nd and Yb: Er and U; and U and Dy; where the absorber ion is listed first. This list is not meant to be exhaustive nor is it restricted to laser ions which will emit in the eyesafe region. However, it does give absorber-laser ion combinations that illustrate absorption at diode laser wavelengths and have quasi-four-level laser transitions. Additionally, other appropriate host crystals may be employed for these ion combinations including transparent oxide crystals, transparent fluoride crystals, transparent garnets, yttrium aluminum garnet, YAlO$_3$ and LiYF$_4$.

The advantage of the laser of the present invention is that it allows fabrication of a miniature laser employing the high efficiency of a laser diode pump source for producing an output laser beam in the eyesafe region with wavelengths longer than 1.4 microns with operation at or near room temperature.

What is claimed is:

1. In a laser apparatus:
   optical pumping means including a laser diode for emitting coherent optical pumping radiation at a narrow band resonant wavelength;
   laser gain medium means disposed to receive the pumping radiation and including a host material doped with a first concentration of a first lasant ion for emitting output coherent optical radiation of an output wavelength from a certain lasant energy level transition; and said laser gain medium host material also being doped with a second concentration of a second ion for absorbing the narrow band coherent optical pumping radiation produced by said laser diode and for transferring energy absorbed from said narrow band pumping radiation to said first lasant ion for inverting the population density of said certain lasant energy levels of said first ion from which lasant energy transitions at an output wavelength are obtained.

2. The laser apparatus of claim 1 wherein said first lasant ion is selected from the group consisting of Tm, Ho, Dy, Yb, and U.

3. The laser apparatus of claim 1 wherein said second ion is selected from the group consisting of Tm, Er, Nd, and U.

4. The laser apparatus of claim 1 wherein said first lasant ion is selected from the group consisting of Tm, Ho, Dy, Yb, U and said second ion is selected from the group consisting of Tm, Er, Nd, and U.

5. The apparatus of claim 1 wherein the host material is selected from the group consisting of transparent oxide crystals, transparent fluoride crystals, transparent garnets, yttrium aluminum garnet, YAlO$_3$, and LiYF$_4$.

6. The apparatus of claim 1 wherein said second concentration of said second ion is greater than 4 times the first concentration of said first ion.

7. The apparatus of claim 1 including a third concentration of a third ion to moderate energy transfer up-conversion which would otherwise limit the desired population inversion of the lasant energy levels of the first ion.

8. The apparatus of claim 1 wherein the output wavelength is longer than 1.4 microns.

9. The apparatus of claim 1 including, tuning means for tuning the wavelength of the diode laser pumping radiation to an absorption peak of said second ion.

10. The apparatus of claim 1 wherein said host material is disposed to receive the pumping radiation through a face thereof and along a path at least partially co-extensive with the optical axis of the laser gain medium.

11. In a method of generating coherent output optical radiation of an output wavelength, the steps of:

exciting a laser diode to produce a beam of coherent narrow band optical pumping radiation; and directing the narrow band pumping radiation into a laser gain medium comprising a host material doped by a first concentration of a first ion and a second concentration of a second ion for causing the second ion to absorb the narrow band pumping radiation and to transfer absorbed energy to said first ion to produce a population inversion of certain lasant energy levels of the first ion from which lasant energy transitions are obtained to produce the coherent output optical radiation at the output wavelength.

12. The method of claim 11 wherein said first lasant ion is selected from the group consisting of Tm, Ho, Dy, Yb, and U.

13. The method of claim 11 wherein said second ion is selected from the group consisting of Tm, Er, Nd, and U.

14. The method of claim 11 wherein said first lasant ion is selected from the group consisting of Tm, Ho, Dy, Yb, and U, and said second ion is selected from the group consisting of Tm, Er, Nd, and U.

15. The method of claim 11 wherein the host material is selected from the group consisting of transparent oxide crystals, transparent fluoride crystals, transparent garnets, yttrium aluminum garnet, YAlO$_3$, and LiYF$_4$.

16. The method of claim 11 wherein the second concentration of said second ion is greater than 4 times the first concentration of said first ion.

17. The method of claim 11 including a third concentration of a third ion to moderate energy transfer up-conversion which would otherwise limit the desired population inversion of the lasant energy levels of the first ion.

18. The method of claim 11 wherein the output wavelength is longer than 1.4 microns.

19. The method of claim 11 including, the steps of tuning the wavelength of the diode laser pumping radiation to an absorption peak of said second ion.

20. The method of claim 11 wherein said host material is shaped to receive the pumping radiation through a face thereof and along a path at least partially co-extensive with the optical axis of the laser gain medium.

* * * * *